(12) United States Patent
Choi et al.

(10) Patent No.: US 8,834,075 B2
(45) Date of Patent: Sep. 16, 2014

(54) CUTTING INSERT

(75) Inventors: Chang Hee Choi, Daegu (KR); Chang Gyu Park, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 575 days.

(21) Appl. No.: 12/997,459

(22) PCT Filed: Jun. 13, 2008

(86) PCT No.: PCT/KR2008/003351
§ 371 (c)(1),
(2), (4) Date: Dec. 10, 2010

(87) PCT Pub. No.: WO2009/151169
PCT Pub. Date: Dec. 17, 2009

(65) Prior Publication Data
US 2011/0097164 A1    Apr. 28, 2011

(51) Int. Cl.
*B23B 27/16* (2006.01)
*B23C 5/20* (2006.01)
*B23C 5/08* (2006.01)
*B23C 5/22* (2006.01)

(52) U.S. Cl.
CPC ............... *B23C 5/2226* (2013.01); *B23C 5/202* (2013.01); *B23C 2200/0438* (2013.01); *B23C 5/08* (2013.01)
USPC ................... 407/113; 407/42; 407/48; 407/61

(58) Field of Classification Search
CPC ........ B23B 27/16; B23C 5/202; B23C 5/226; B23C 5/20
USPC ....................... 407/113, 40, 42, 58, 61, 48, 53
See application file for complete search history.

(56) References Cited

U.S. PATENT DOCUMENTS 3,466,720 A * 9/1969 Stier .............................. 407/113
5,071,291 A * 12/1991 Kaminski ....................... 407/30
(Continued)

FOREIGN PATENT DOCUMENTS

JP         62-039106 A  *  2/1981  ............... B23C 5/20
JP      2004-314301 A  * 11/2004  ............... B23C 5/20
(Continued)

OTHER PUBLICATIONS

International Search Report in PCT/KR2008/003351, dated Mar. 11, 2009

(Continued)

*Primary Examiner* — Andrea Wellington
*Assistant Examiner* — Ryan Rufo
(74) *Attorney, Agent, or Firm* — Womble Carlyle (57) ABSTRACT

A cutting insert has a top surface and a bottom surface having a parallelogram shape, and four side surfaces connecting the top and bottom surfaces. One or more primary cutting edges are formed at intersections between the top and bottom surfaces and two opposing side surfaces. Secondary cutting edges are formed at intersections between the top and bottom surfaces and two other opposing side surfaces. The primary cutting edge forms a first angle with respect to a median plane parallel to the top and bottom surfaces. The secondary cutting edge forms a second angle with respect to the median plane. The top and bottom surfaces have a mounting surface and a rack surface, wherein the rack surface extends inwardly from the cutting edge toward the median plane. The top and bottom surfaces of the cutting insert have mirror symmetry with respect to the median plane.

14 Claims, 9 Drawing Sheets

(56) References Cited

U.S. PATENT DOCUMENTS

| | | | |
|---|---|---|---|
| 6,238,146 B1 * | 5/2001 | Satran et al. | 407/113 |
| 7,104,735 B2 | 9/2006 | Johnson et al. | |
| 7,147,407 B2 | 12/2006 | Satran | |
| 7,306,409 B2 * | 12/2007 | Stabel et al. | 407/113 |
| 7,357,603 B2 * | 4/2008 | Hoefler et al. | 407/66 |
| 2001/0002972 A1 | 6/2001 | Satran et al. | |
| 2005/0063792 A1 * | 3/2005 | Satran | 407/113 |
| 2005/0169716 A1 | 8/2005 | Smilovici et al. | |
| 2005/0214080 A1 * | 9/2005 | Satran | 407/113 |
| 2006/0165828 A1 | 7/2006 | Smilovici et al. | |
| 2006/0257214 A1 * | 11/2006 | Johnson et al. | 407/40 |
| 2008/0226404 A1 * | 9/2008 | Nada et al. | 407/114 |

FOREIGN PATENT DOCUMENTS

| | | |
|---|---|---|
| KR | 10 2006 0135211 | 12/2006 |
| KR | 10 0718306 | 5/2007 |
| RU | 2264249 C1 | 9/2006 |
| SU | 416172 A | 2/1974 |
| SU | 1542700 A1 | 2/1990 |
| WO | WO 2005/028149 | 3/2005 |
| WO | WO 2007/004206 | 1/2007 |

OTHER PUBLICATIONS

Written Opinion in PCT/KR2008/003351, dated Mar. 11, 2009.
Official Action dated Nov. 2, 2011 issued in counterpart Russian Application No. 2011100849/02(001076).
European Search Report dated Dec. 2, 2011 issued in counterpart European Application No. 08766313.4.
Official action dated Aug. 17, 2012 issued in Japanese counterpart application (No. 2011-513403).
Patent publication dated Nov. 20, 2012 issued in Russian counterpart application (No. 2466831).
Office Action dated Dec. 21, 2012 issued in Japanese counterpart application (No. 2011-513403).

* cited by examiner

CUTTING INSERT

RELATED APPLICATIONS

This is a 35 USC 371 U.S. National Phase of International Application No. PCT/KR2008/003351, filed 13 Jun. 2008 and published in English as WO 2009/151169A1 on 17 Dec. 2009. The contents of the aforementioned international application are incorporated by reference in their entirety.

TECHNICAL FIELD

The present invention relates to a cutting insert for use in a cutting tool such as a milling cutter.

BACKGROUND ART

A cutting insert is either directly mounted to a tool body or indirectly connected to the same by using a cartridge. The cutting insert comprises cutting edges that contact a workpiece so as to cut it during a cutting process. In a cutting process, a cutting insert with left-handed cutting edges and a cutting insert with right-handed cutting edges are used. When seen from a tool body, the left-handed cutting edge is used in a counterclockwise rotation of a milling cutter, while the right-handed cutting edge is used in a clockwise rotation of the milling cutter.

Figure 1:
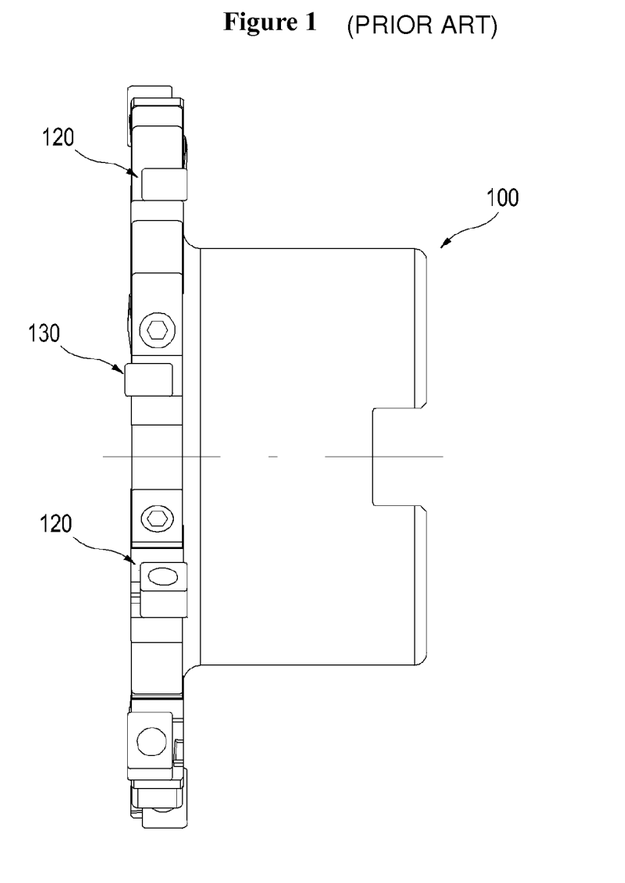
FIG. 1 is a side view of a slotting cutter for producing a groove.
Figure 2:
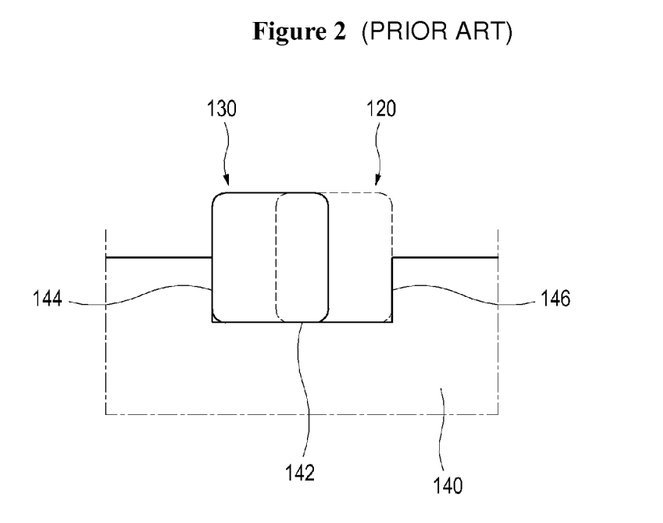
FIG. 2 shows a groove processing using the slotting cutter of FIG. 1.

FIG. 1 is a side view of a slotting cutter designed to perform a groove processing. FIG. 2 shows the groove processing using the slotting cutter shown in FIG. 1.

As shown in FIG. 1, a cutting insert 130 with right-handed cutting edges and a cutting insert 120 with left-handed cutting edges are alternately arranged in a slotting cutter 100. As shown in FIG. 2, when the slotting cutter 100 rotates, the cutting insert 130 with the right-handed cutting edges processes the bottom surface 142 and one side 144 of the groove. The cutting insert 120 with the left-handed cutting edges processes the bottom surface 142 and the other side 144 of the groove. Accordingly, a groove is formed in the workpiece 140. The cutting insert with the left-handed cutting edges and the cutting insert with the right-handed cutting edges are alternately mounted to process a groove in order to adjust the distance therebetween, thereby adjusting the width of the processed groove.

As such, in the cutting process such as a groove processing using the slotting cutter, the cutting process is performed by using the cutting insert with the left-handed cutting edges and the cutting insert with the right-handed cutting edges mounted in their respective places. If the cutting insert with the right-handed cutting edges is mounted in the position of the cutting insert with the left-handed cutting edges or vice-versa, then the cutting process cannot be successfully performed. Nonetheless, a cutting insert may be mounted out of place due to an operator's mistake and the like. Thus, there is a need to prevent such a problem.

SUMMARY OF THE INVENTION

The objective of the present invention is to solve the above problems of the prior art. The present invention is directed to providing a cutting insert comprising left-handed cutting edges and/or right-handed cutting edges, wherein the shape of said cutting insert enables it to be mounted on the cartridge (or cutter body) only in the correct direction.

Further, the objective of the present invention is to provide a cutting insert having a shape, which enables the cutting insert to be firmly mounted on the tool body (or the cartridge).

In order to achieve the above objectives, the present invention provides a cutting insert, comprising: a top surface and a bottom surface each having a shape of a parallelogram; four side surfaces connecting the top surface and the bottom surface; one or more primary cutting edges formed at an intersection between the top surface and the bottom surface with two opposing side surfaces; and one or more secondary cutting edges formed at an intersection between the top surface and the bottom surface with two other opposing side surfaces. The primary cutting edges form a first angle with respect to a median plane, which is parallel to the top and bottom surfaces and positioned therebetween. The secondary cutting edges form a second angle with respect to the median plane. The first and second angles are in the range of 3° to 13°. The primary cutting edges merge with the secondary cutting edges to form a continuous cutting edge. The top and bottom surfaces comprise a mounting surface and a rake surface. The rake surface extends from the cutting edge towards the median plane. The top and bottom surfaces are mirror symmetrical with respect to the median plane. The cutting insert has 180° rotational symmetry about an axis passing through the respective centers of the top and bottom surfaces.

According to one embodiment of the present invention, each of the two opposing side surfaces with the primary cutting edges comprises two inclined surfaces, wherein each of said inclined surfaces forms an acute angle in the range of 5° to 15° with respect to a vertical plane.

According to one embodiment of the present invention, a cartridge for use in a cutting tool comprises a pocket for receiving the cutting insert according to the present invention. The pocket comprises a radial seat surface and a bottom seat surface. The radial seat surface is inclined at the same angle as an interior angle between the primary cutting edge and the secondary cutting edge of the top and bottom surfaces. The bottom seat surface comprises a first inclined surface and a second inclined surface, which are inclined at the same angle as the first angle of the primary cutting edge and the second angle of the secondary cutting edge, respectively.

According to one embodiment of the present invention, a cutting tool comprises a pocket for receiving the cutting insert of the present invention. The pocket comprises a radial seat surface and a bottom seat surface. The radial seat surface is inclined at the same angle as an interior angle between the primary cutting edge and the secondary cutting edge of the top and bottom surfaces. The bottom seat surface comprises a first inclined surface and a second inclined surface, which are inclined at the same angle as the first angle of the primary cutting edge and the second angle of the secondary cutting edge, respectively.

DETAILED DESCRIPTION

A cutting insert of the present invention will be hereinafter described with reference to embodiments illustrated in the accompanying drawings.

Figure 3:
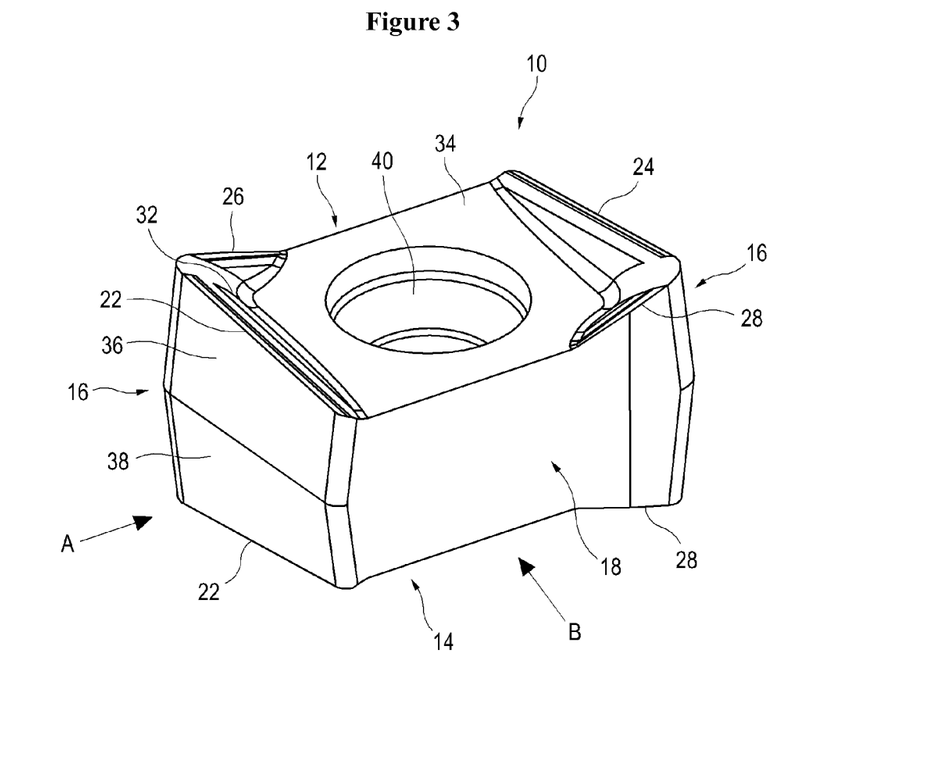
FIG. 3 is a perspective view of a cutting insert in accordance with an embodiment of the present invention.
Figure 4:
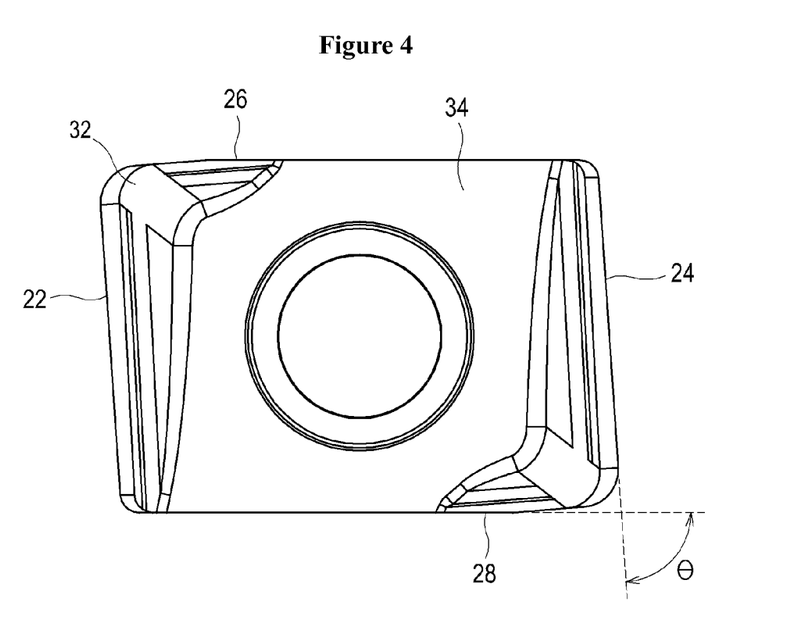
FIG. 4 is a top view of the cutting insert of FIG. 3.
Figure 5:
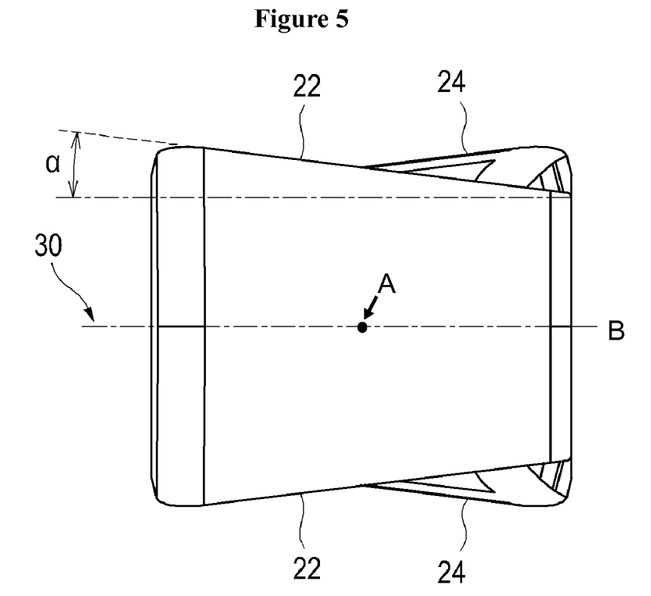
FIG. 5 is a side view taken from the direction A of the cutting insert of FIG. 3.
Figure 6:
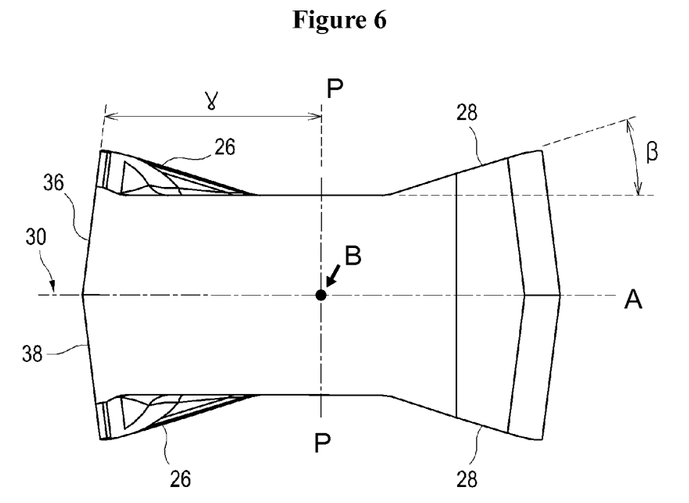
FIG. 6 is a side view taken from the direction B of the cutting insert of FIG. 3.

FIG. 3 is a perspective view of a cutting insert in accordance with an embodiment of the present invention. FIG. 4 is a top view of the cutting insert of FIG. 3. FIG. 5 is a side view taken from the direction A of the cutting insert of FIG. 3. FIG. 6 is a side view taken from the direction B of the cutting insert of FIG. 3.

As shown in FIG. 3, the cutting insert 10 includes a top surface 12 and a bottom surface 14 extending parallel to each other, and four side surfaces 16, 18 connecting the top and bottom surfaces 12, 14. The top and bottom surfaces 12, 14 have the shape of a parallelogram. At the intersection between the top and bottom surfaces 12, 14 with two opposing side surfaces 16, 18 first and second primary cutting edges 22, 24 are formed. Further, at the intersection between the top and bottom surface 12, 14 with two other opposing side surfaces 18, first and second secondary cutting edges 26, 28 are formed. The first primary cutting edge 22 merges with the first secondary cutting edge 26 to form a first cutting edge, while the second primary cutting edge 24 merges with the second secondary cutting edge 28 to form a second cutting edge. The first cutting edge and the second cutting edge are diagonally formed on the top and bottom surfaces 12, 14. The cutting insert 10 has 180° rotational symmetry about an axis, which passes through centers of the top and bottom surfaces 12, 14. The cutting insert 10 has mirror symmetry with respect to a median plane 30, which is located in the middle of the top surface 12 and the bottom surface 14 and is parallel to the top and bottom surfaces 12, 14. The first and second cutting edges of the top surface 12 and the first and second cutting edges of the bottom surface 14 of the cutting insert 10 are mirror symmetrical with respect to the median plane 30. Thus, when the cutting edges of the top surface are a left-handed cutting edge (or a right-handed cutting edge), the cutting edges of the bottom surface may be used as the right-handed cutting edge (or the left-handed cutting edge.) In the illustrated embodiments, the first and second cutting edges of the top surface 12 are the right-handed cutting edge, whereas the first and second cutting edges of the bottom surface 14 are the left-handed cutting edge. When defining the top surface and the bottom surface in an opposite manner to the above, the cutting edges of the top surface may be the left-handed cutting edge and the cutting edges of the bottom surface may be the right-handed cutting edge.

As shown in FIG. 4, the top and bottom surfaces 12, 14 have the shape of a parallelogram. When viewed from the top, edge portions, at which the primary cutting edges 22, 24 are formed, are inclined at acute angle θ with respect to edge portions, at which the secondary cutting edges 26, 28 are formed. As shown in FIG. 5, the first and second primary cutting edges 22, 24 have a first angle α. (not 0 degree) with respect to the median plane 30. Thus, the first and second primary cutting edges 22, 24 have a positive rake angle with respect to the workpiece in a cutting process. Preferably, the first angle α is in the range of 3° to 13°. As shown in FIG. 6, the first and second secondary cutting edges 26, 28 have a second angle β (not 0 degree) with respect to the median plane 30, and each secondary cutting edge is sloped relative to the median plane 30 for a majority of that secondary cutting edge's length. Thus, the first and second secondary cutting edges 26, 28 have a positive rake angle with respect to the workpiece during a cutting process. Preferably, the second angle β is in the range of 3° to 13°. A rake angle may have a positive value (+), "0" or negative value (−). When the rake angle has a positive value, the cutting insert is inclined in an opposite direction to a rotation direction. When the rake angle has a negative value, the cutting insert is inclined in the rotation direction. When the rake angle is "0," the cutting insert is not inclined with respect to an axis of rotation. To decrease cutting resistance, the rake angle of the cutting edge must have at least positive value. Further, to avoid surface contact to the workpiece, the cutting insert 10 is mounted at some relief angle. To allow the rake angles of the primary and secondary cutting edges to have positive values under such a relief angle, it is preferable that the first and second angles α, β are more than 3°. On the contrary, since too large first and second angles α, β make the manufacture of the cutting insert difficult and further reduce a strength of the cutting insert, it is preferable that the first and second angles α, β are less than 13°.

The top and bottom surfaces 12, 14 include a mounting surface 34 and a rake surface 32. The rake surface 32 extends inwardly toward the median plane 30 from the first and second cutting edges formed at the top and bottom surfaces 12, 14 and merges with the mounting surface 34. The two opposing secondary side surfaces 18 are perpendicularly connected to the top and bottom surfaces 12, 14. The other two opposing primary side surfaces 16 may also be perpendicularly connected to the top and bottom surfaces 12, 14. However, in the illustrated embodiments, the other two opposing side surfaces 16 are comprised of two inclined surfaces 36, 38 that are inclined with respect to the median plane 30 toward the first and second primary cutting edges 22, 24 of the top and bottom surfaces 12, 14. The inclined surfaces 36, 38 are inclined at an acute angle γ with respect to vertical plane P which is perpendicular to the median plane 30 and primary side surface axis A, passes through secondary side surfaces 18 and contains secondary side surface axis B. Accordingly, when the cutting insert is mounted on a tool body or a cartridge and a cutting process is performed, an additional support force for clamping the cutting insert is produced in addition to a clamping force caused by a screw. Preferably, the angle γ is in the range of 5° to 15°. When the angle γ is too small, such an additional support force may not be expected and the strength of the primary cutting edges becomes low. Accordingly, the angle γ is preferably more than 5°. On the other hand, when the angle γ is too large, it is difficult to ensure an enough relief angle during a cutting process. As such, the angle γ is preferably less than 15°.

In the center of the cutting insert 10, a mounting hole 40, which passes through the top and bottom surfaces, is formed. The cutting insert 10 is fixed to the tool body or the cartridge by fastening a screw through the mounting hole 40. However, a cutting insert may also be coupled to the tool body by other means.

The use of the cutting insert according to one embodiment of the present invention will be described below.

Figure 7:
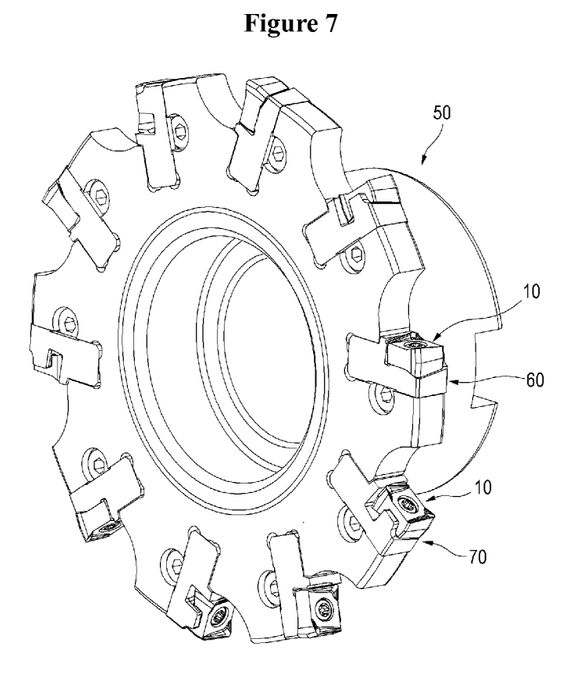
FIG. 7 is a perspective view of a slotting cutter provided with a cutting insert in accordance with an embodiment of the present invention.
Figure 8:
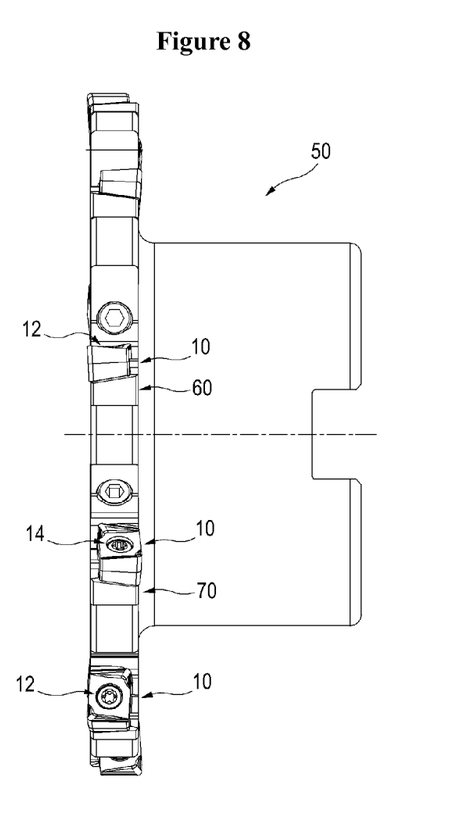
FIG. 8 is a side view of the slotting cutter of FIG. 7.

FIG. 7 is a perspective view of a slotting cutter provided with a cutting insert according to the present invention. FIG. 8 is a side view of the slotting cutter of FIG. 7. The cutting insert 10 according to one embodiment of the present invention shown in FIGS. 3 to 7 has a right-handed cutting edge at the top surface 12 and a left-handed cutting edge at the bottom surface 14. As shown in FIG. 8, when a groove machining is performed by using the cutting insert 10, the cutting insert 10 is mounted on the slotting cutter 50 such that the right-handed cutting edges of the top surface 12 and the left-handed cutting edges of the bottom surface 14 are alternately arranged. As the slotting cutter with such arrangement rotates, the right-handed cutting edges machine a bottom surface and one side surface of a groove, while the left-handed cutting edges machine the bottom surface and the other side surface of the groove, thereby forming a groove on a workpiece.

Figure 9:
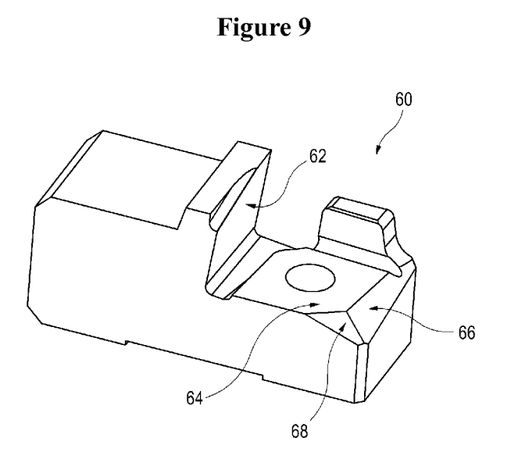
FIG. 9 is a perspective view of a cartridge where a cutting insert according to an embodiment of the present invention is mounted thereon.

FIG. 9 is a perspective view of a cartridge where a cutting insert of the present invention is mounted thereon. The cartridge 60 includes a pocket for receiving the cutting insert 10 therein. The pocket has a shape corresponding to the cutting insert 10. The pocket includes a radial seat surface 62 and a bottom seat surface 64. The radial seat surface 62 is inclined at the same angle as the acute interior angle θ between the primary and secondary cutting edges of top and bottom surfaces of the cutting insert 10. The bottom seat surface 64 includes a first inclined surface 66 and a second inclined surface 68. The first inclined surface 66 is inclined at the same angle as the first angle α of the first and second primary cutting edges 22, 24. The second inclined surface 68 is inclined at the same angle as the second angle β of the first and second secondary cutting edges 26, 28. As can be seen from FIGS. 5 & 6, the cutting insert 10 is rotational asymmetric about both the primary side surface axis A and the secondary side surface axis B, both of which lie on the median plane 30 and pass through respective primary and secondary side surfaces. The cutting insert 10 can be mounted on the cartridge 60 such that only the right-handed cutting edges of the top surface 12 are used as a machining cutting edge. When an operator tries to intentionally or erroneously mount the left-handed cutting edge of the bottom surface 14 of the cutting insert 10 as a machining cutting edge (i.e., when the top surface 12 of the cutting insert 10 abuts the bottom seat surface 64 of the cartridge 60), an interference is generated between the radial seat surface 62 of the pocket of the cartridge 60 and the side surface 16 of the cutting insert 10, between the first inclined surface 66 of the bottom seat surface 64 of the pocket of the cartridge 60 and the primary cutting edge of the top surface 12 of the cutting insert 10, and between the second inclined surface 68 of the bottom seat surface 64 of the pocket of the cartridge 60 and the secondary cutting edge of the top surface 12 of the cutting insert 10. Thus, the left-handed cutting edge of the bottom surface 14 of the cutting insert 10 cannot be mounted on the cartridge 60 as the machining cutting edge, thereby preventing an incorrect mounting of the cutting insert 10. Although not shown in detail, it could be appreciated that the cartridge 70 has a shape corresponding to the cutting insert such that the cutting insert 10 is mounted in the position where the left-handed cutting edges of the bottom surface 14 are used as the machining cutting edge, thereby preventing an incorrect mounting of the cutting insert.

Figure 10:
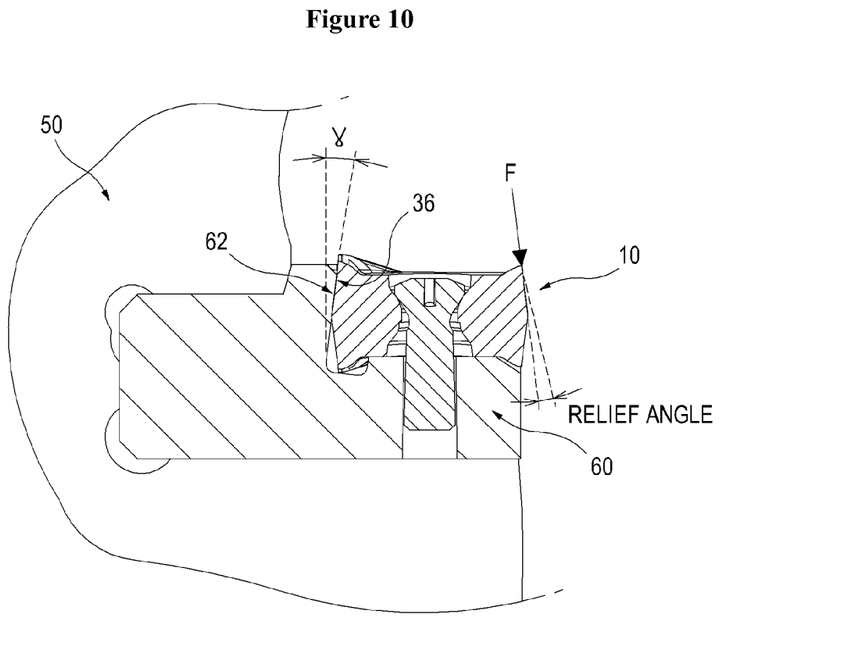
FIG. 10 is a sectional view showing a cutting insert mounted on the cartridge of FIG. 9.

FIG. 10 is a sectional view showing a cutting insert 10 mounted on the cartridge 60 of FIG. 9. The inclined surface 36 of the side surface 16 of the cutting insert 10 abuts the radial seat surface 62 of the cartridge 60, which is inclined at the same angle γ as the inclined surface 36. Thus, the radial seat surface 62 provides an additional support force, in addition to the fastening force caused by the screw fastened through the mounting hole 40, to clamp the cutting insert against the cutting force F generated during a cutting process. As a result, the cutting insert may be more securely fixed to the cartridge than a cutting insert fixed to a cartridge only with fastening force of a screw because its side surfaces are perpendicularly connected to top and bottom surfaces. Moreover, since the cutting insert can be fixed by a smaller-size screw, strength of the cutting insert can be enhanced by decreasing a size of the mounting hole and increasing a volume of the cutting insert.

The cutting insert 10 according to one embodiment of the present invention is configured such that the first cutting edge and the second cutting edge are diagonally formed at the top surface 12 and the bottom surface 14, respectively. Since each of the top surface 12 and the bottom surface 14 has two cutting edges, the cutting insert is economical in that four sides can be used in total depending on its mounting position.

While the present invention has been described by way of preferred embodiments thereof, those embodiments are for exemplary purposes only. It will be understood by those of ordinary skill in the art that various alternations or modifications may be made without departing from the scope of the present invention. For example, the cutting insert according to one embodiment of the present invention forms the cutting edges on all intersections between the top surface or the bottom surface and the side surfaces. However, it will be apparent to persons skilled in the art that the cutting edges are merely formed on the part of intersections, if desired. For the cutting insert according to one embodiment of the present invention, the top and bottom surfaces have mirror symmetry with respect to the median plane, i.e., one cutting insert includes the left-handed cutting edge and the right-handed cutting edge together. However, the cutting insert may have 180° rotational symmetry about the axis, which passes through the centers of the side surface and the opposing side surface. In such a case, the cutting insert includes only one of the left-handed cutting edge and the right-handed cutting edge. For the slotting cutter, two types of cutting inserts, i.e., the cutting insert having the left-handed cutting edge and the cutting insert having the right-handed cutting edge, are used. While the cutting insert according to one embodiment of the present invention is generally described as suitable for use as a slotting cutter for machining grooves, it will be apparent to one skilled in the art that the cutting insert is applicable to other cutting operations.

As described above, the present invention provides a cutting insert including the left-hand cutting edge and/or the right-handed cutting edge. The cutting insert has a shape to enable the cutting insert to be mounted in a proper position and prevent an incorrect mounting of the cutting inert. Further, the cutting insert of the present invention has a shape to enable the cutting insert to be more securely mounted on the tool body directly or with the cartridge interposed therebetween.

The invention claimed is:

1. A cutting insert, comprising:
 a top surface and a bottom surface each having a shape of a parallelogram;
 four side surfaces connecting the top surface and the bottom surface, the four side surfaces comprising two opposing primary side surfaces and two opposing secondary side surfaces;
 a mounting hole passing through the top and bottom surfaces;
 one or more primary cutting edges each formed at an intersection between the top surface and one of said two opposing primary side surfaces, and one or more primary cutting edges each formed at an intersection between the bottom surface and one of said two opposing primary side surfaces;
 one or more secondary cutting edges each formed at an intersection between the top surface and one of said two opposing secondary side surfaces, and one or more secondary cutting edges each formed at an intersection between the bottom surface and one of said two opposing secondary side surfaces;

wherein the primary cutting edges form a non-zero first angle with respect to a median plane parallel to the top and bottom surfaces and being positioned therebetween;

wherein the secondary cutting edges form a non-zero second angle with respect to the median plane, each secondary cutting edge being sloped relative to the median plane for a majority of that secondary cutting edge's length;

wherein the primary cutting edges merge with the secondary cutting edges to form a continuous cutting edge;

wherein the top surface and the bottom surface comprise a mounting surface and a rake surface, the rake surface extending from the cutting edge towards the median plane;

wherein the top surface and the bottom surface are mirror symmetrical with respect to the median plane; and wherein the cutting insert is rotationally asymmetric about each axis lying in the median plane.

2. The cutting insert according to claim 1, wherein the cutting insert has 180° rotational symmetry about an axis passing through the respective centers of the top and bottom surfaces.

3. The cutting insert according to claim 2, wherein each of the two opposing primary side surfaces with the primary cutting edges comprises two inclined surfaces, each of said inclined surfaces forming an acute angle with respect to a vertical plane which is perpendicular to the median plane and passes through the opposing secondary side surfaces.

4. The cutting insert according to claim 3, wherein the acute angle is in a range of 5° to 15°.

5. The cutting insert according to claim 1, wherein the non-zero first angle and the non-zero second angle are in a range of 3° to 13°.

6. A cartridge for use in a cutting tool comprising a pocket for receiving the cutting insert according to claim 1;

wherein the pocket comprises a radial seat surface and a bottom seat surface;

wherein the radial seat surface is inclined at a same angle as an interior angle (θ) between the primary and secondary cutting edges of the top and bottom surfaces; and wherein the bottom seat surface comprises a first inclined surface and a second inclined surface inclined at a same angle as the non-zero first angle of the primary cutting edge and the non-zero second angle of the secondary cutting edge, respectively.

7. A cutting tool comprising a pocket for receiving the cutting insert according to claim 1;

wherein the pocket comprises a radial seat surface and a bottom seat surface;

wherein the radial seat surface is inclined at a same angle as an interior angle (θ) between the primary and secondary cutting edges of the top and bottom surfaces; and wherein the bottom seat surface comprises a first inclined surface and a second inclined surface inclined at a same angle as the non-zero first angle of the primary cutting edge and the non-zero second angle of the secondary cutting edge, respectively.

8. The cutting tool according to claim 7, wherein the cutting tool is a slotting cutter used for a groove processing.

9. The cutting tool according to claim 8, wherein the slotting cutter has a plurality of pockets arranged along a periphery thereof, alternating pockets having radial seat surfaces inclined in opposite directions relative to a rotary axis of the slotting cutter.

10. The cutting insert according to claim 1, wherein:
in a top view of the cutting insert, the primary cutting edges are inclined at an interior angle (θ) with respect to the secondary cutting edges with which they merge to form a continuous cutting edge.

11. The cutting insert according to claim 10, wherein:
in a side view of a secondary side surface, each of the two opposing primary side surfaces comprises two inclined surfaces, each of said inclined surfaces forming an acute angle with respect to a vertical plane which is perpendicular to the median plane and passes through the opposing secondary side surfaces.

12. The cutting insert according to claim 11, wherein:
the cutting insert is rotationally asymmetric about a primary side surface axis lying on the median plane and passing through the opposing primary side surfaces; and
the cutting insert is rotationally asymmetric about a secondary side surface axis lying on the median plane and passing through the opposing secondary side surfaces.

13. The cutting insert according to claim 1, wherein each secondary cutting edge is sloped relative to the median plane along less than one-half a length of the secondary side surface.

14. A cutting insert, comprising:
a top surface and a bottom surface each having a shape of a parallelogram;
four side surfaces connecting the top surface and the bottom surface, the four side surfaces comprising two opposing primary side surfaces and two opposing secondary side surfaces;
one or more primary cutting edges each formed at an intersection between the top surface and one of said two opposing primary side surfaces, and one or more primary cutting edges each formed at an intersection between the bottom surface and one of said two opposing primary side surfaces;
one or more secondary cutting edges each formed at an intersection between the top surface and one of said two opposing secondary side surfaces, and one or more secondary cutting edges each formed at an intersection between the bottom surface and one of said two opposing secondary side surfaces; and
a mounting hole passing through the top and bottom surfaces;
wherein the primary cutting edges form a non-zero first angle with respect to a median plane parallel to the top and bottom surfaces and being positioned therebetween;
wherein the secondary cutting edges form a non-zero second angle with respect to the median plane;
wherein the primary cutting edges merge with the secondary cutting edges to form a continuous cutting edge;
wherein the top surface and the bottom surface comprise a mounting surface and a rake surface, the rake surface extending from the cutting edge towards the median plane;
wherein the top surface and the bottom surface are mirror symmetrical with respect to the median plane; and
wherein the cutting insert is rotationally asymmetric about each axis lying in the median plane.

* * * * *